(12) United States Patent
Mayer et al.

(10) Patent No.: US 12,318,707 B2
(45) Date of Patent: Jun. 3, 2025

(54) PROCESS SUPPORTED BY EQUIPMENT GROUP FOR EXTRACTING COMPOUNDS FROM BOTANICALS

(71) Applicant: Double Down Holdings Inc., Reno, NV (US)

(72) Inventors: Ryan Mayer, Gilbert, AZ (US); Russell Rheingrover, San Francisco, CA (US)

(73) Assignee: Double Down Holdings Inc., Reno, NV (US)

( * ) Notice: Subject to any disclaimer, the term of this patent is extended or adjusted under 35 U.S.C. 154(b) by 1045 days.

(21) Appl. No.: 17/175,601

(22) Filed: Feb. 12, 2021

(65) Prior Publication Data
US 2021/0245073 A1    Aug. 12, 2021

Related U.S. Application Data

(60) Provisional application No. 62/975,593, filed on Feb. 12, 2020.

(51) Int. Cl.
*B01D 11/02* (2006.01)
*C11B 1/10* (2006.01)
*C11B 3/00* (2006.01)
*B01D 11/00* (2006.01)

(52) U.S. Cl.
CPC ...... *B01D 11/0257* (2013.01); *B01D 11/0207* (2013.01); *B01D 11/0261* (2013.01); *B01D 11/0284* (2013.01); *B01D 11/0288* (2013.01); *C11B 1/10* (2013.01); *C11B 3/006* (2013.01); *B01D 2011/007* (2013.01); *B01D 11/0215* (2013.01)

(58) Field of Classification Search
CPC ............ B01D 11/0257; B01D 11/0207; B01D 11/0261; B01D 11/0284; B01D 11/0288; B01D 11/0215; B01D 2011/007; C11B 1/10; C11B 3/006
See application file for complete search history.

*Primary Examiner* — Deborah D Carr
(74) *Attorney, Agent, or Firm* — Cynthia S. Lamon; Lamon Patent Services

(57) ABSTRACT

An apparatus and process for extracting organic molecular compounds from plant material and concentrating those into a viscous oil, the process supported by a machine architecture that heats, cools, and stirs a cooking mixture of plant material and a consumable solvent oil, the viscous oil suitable for use in sublingual tinctures, food products, and topical salves.

9 Claims, 6 Drawing Sheets

500

| Cannabinoids | Milligrams/Milliliters (mg/ml) | %/sample |
|---|---|---|
| CBD-V | 0.18 | 0.01% |
| CBD-A | 1.29 | 0.10% |
| CBG | 0.13 | 0.01% |
| CBD | 8.81 | 0.71% |
| THC-V | ND | ND |
| CBN | ND | ND |
| Delta 9-THC | 0.34 | 0.03% |
| CBC | 0.34 | 0.03% |

501

| Cannabinoid Totals | Milligrams/Milliliters (mg/ml) | %/sample |
|---|---|---|
| Max Active THC | 0.34 | 0.03% |
| Max Active CBD | 9.95 | 0.80% |
| T. Active Cannabinoids | 9.81 | 0.79% |
| Total Cannabinoids | 11.10 | 0.89% |

502

| Maximum Active Cannabinoid Ratios |
|---|
| CBD to THC = 28.9 : 1 |
| THC to CBD = 0.0 : 1 |

Tincture at 2X

| Cannabinoids | Milligrams/Milliliters (mg/ml) | %/sample |
|---|---|---|
| CBD-V | 0.24 | 0.02% |
| CBD-A | 0.65 | 0.05% |
| CBG | 1.00 | 0.08% |
| CBD | 13.96 | 1.08% |
| THC-V | ND | ND |
| CBN | ND | ND |
| Delta 9-THC | 0.59 | 0.05% |
| CBC | 0.65 | 0.05% |

504

| Cannabinoid Totals | Milligrams/Milliliters (mg/ml) | %/sample |
|---|---|---|
| Max Active THC | 0.59 | 0.05% |
| Max Active CBD | 14.53 | 1.13% |
| T. Active Cannabinoids | 16.44 | 1.28% |
| Total Cannabinoids | 17.09 | 1.33% |

505

| Maximum Active Cannabinoid Ratios |
|---|
| CBD to THC = 24.7 : 1 |
| THC to CBD = 0.0 : 1 |

Tincture at 3X

*Fig. 5B*

PROCESS SUPPORTED BY EQUIPMENT GROUP FOR EXTRACTING COMPOUNDS FROM BOTANICALS

PRIORITY

This application claims benefit of priority to U.S. Provisional Patent Application No. 62/975,593 filed on Feb. 12, 2020, the disclosure of which is incorporated in its entirety by reference herein.

BACKGROUND OF THE INVENTION

1. Field of the Invention

The present disclosure generally relates to the field of processing organic materials and pertains more particularly to methods and apparatus for isolating and concentrating organic molecular compounds like cannabinoids from raw plant materials, such as hemp.

2. Discussion of the State of the Art

In the arts of organic material processing much development has occurred relative to extraction of essential oils from raw plant materials. Manufacturers use different types of processes supported by equipment to strip or "wash" certain primary molecular compounds from the host materials and isolate them for further processing into a final form. For example, manufacturers may use a variety of carrier solvents to extract molecular cannabinoid compounds like Cannabidiol (CBD) from hemp or *cannabis* plants based raw materials. Methanol, ethanol, alcohol, acetates, ether, chloroforms, water, and carbon dioxide ($CO_2$) gases are commonly used as well as butane and propane.

The solvents generally work to wash through plant materials, effectively stripping molecular compounds from the host material, siphoning the compounds off with the solvents, and then evaporating the solvents which contain the desired compounds, or recovering the solvents leaving the desired compounds to be collected for use in tinctures, oils, and other consumable and topical products.

Another extraction method that use cold and heat/cold press methods to obtain desired compounds are known to the inventors. While these methods may be solvent free, they also are mostly designed to produce smaller finished product batches, and such processes have not been optimized to maximize desired outcomes. However, commercial presses that can press larger batches of raw botanical materials are still being developed at this time.

A drawback of using solvents to extract compounds is the potential for the solvent or byproducts thereof remaining in and therefore contaminating the final product. This is of particular importance due to strict government requirements to reduce or remove solvents from plant extracts. Another drawback of solvents-based processes is they may neutralize, render inert, damage or otherwise breakdown naturally occurring polymorphs, macrocomplexes like molecular compounds, synergistic macrocomplexes of different molecular compounds, or variants, CBDA vs CBD, for example, of the primary molecules that might be valuable and that might work in synergistic manner with the primary molecular compounds sought for preservation such as CBD, for example.

While other non-toxic methods for extracting molecular compounds exist, like CBD from raw materials, such as extractions using oil and water, they are cumbersome and timely processes that require near constant interaction by the user. As such, these processes are only practical for smaller personal batches of product as opposed to the commercial market scenario where mass manufacturing is required to hold down costs and be profitable.

Therefore, what is clearly needed is an economic commercial extraction process, requiring less monitoring and/or time. Such process may be supported by a closed loop machine grouping for botanical raw materials that is organic, preserves the original compound structures of desirable sub-compounds found in the botanical materials and further concentrates the percentages the primary compounds in a fashion that is repeatable with the same results.

BRIEF SUMMARY OF THE INVENTION

This application describes a machine group supporting semi-automated processing of plant material for desired molecular compounds for use in consumables and topical salves comprising: a cooking vessel adapted to contain plant material and a consumable organic solvent, the cooking vessel having a heating cooling jacket formed by a double wall; a mixture stirring apparatus mounted over the cooking vessel and extending into the cooking vessel for automated stirring of the plant material in the consumable solvent; a first fluid reservoir separate from but connected for circulation by pump to the heating and cooling jacket of the cooking vessel, the first fluid reservoir adapted to contain a heat transfer fluid; at least one inline heating device connected in the circulation path for heating the transfer oil; a heat exchange apparatus connected to the heat transfer oil circulation loop via ingress and egress valves and associated transfer lines, the valves controllable to open or close; separate from but connected for circulation by pump to the heat exchanger; and a chilling unit connected to the second reservoir for circulation by pump, the chilling unit functioning to lower the temperature of the transfer oil.

This application describes process for extracting organic molecular compounds from raw plant material and concentrating those into a viscous oil comprising steps: (a) prepare the raw plant material for processing; (b) load the raw plant material into a cooking vessel having a heating and cooling jacket; (c) add an solvent into the cooking vessel; (d) circulate a heating and cooling transfer oil through the heating and cooling jacket; (e) apply heat to the heating and cooling transfer oil for a time period; (f) optionally stir the plant material and consumable solvent in the cooking vessel during the time period of step (e); (g) power off heat source and divert heated transfer oil into a connected heat exchanger; (h) from a separate reservoir containing chilled heating and cooling transfer oil, the reservoir connected to the heat exchanger, pump the chilled heating and cooling transfer oil through the heat exchanger for a time period; (i) optionally stir the plant material and consumable solvent in the cooking vessel during the time period of step (h); (j) remove plant material from the cooking vessel and prepare it for pressing by a heated or non-heated press; (k) press the plant material and collect the remaining oil; and (l) introduce the extracted oil back into the solvent oil in the cooking vessel with fresh plant material.

The above-described process may optionally repeat steps (e) through (i) a desired number of times to heat and then cool the plant material and consumable solvent.

Preferably steps (e) and (i) may be repeated between 2 and 12 times to maximize the beneficial qualities being extracted from the plant material and/or to get the precise level(s) of desired compound(s).

More preferably steps (e) and (i) may be repeated 4, 5, 6, 7, 8, 9, or 10 times to maximize the beneficial qualities being extracted from the plant material and/or to get the precise level(s) of desired compound(s).

The above-described process may optionally repeat (d) through (l) a desired number of times to concentrate the consumable solvent to a higher percentage of recovered compound molecules or to get precise level(s) of desired compound(s).

Preferably steps (d) and (l) may be repeated between 2 and 12 times to maximize the beneficial qualities being extracted from the plant material and/or to get the precise level(s) of desired compound(s).

More preferably steps (d) and (l) may be repeated 4, 5, 6, 7, 8, 9, or 10 times to maximize the beneficial qualities being extracted from the plant material and/or to get the precise level(s) of desired compound(s).

Step (e) may optionally be done with stirring intermittently or continuously stirring depending on the product composition for a period of time dependent on material and batch size.

In step (e) the mixture may be optionally stirred continuously.

Alternatively, in step (e) the mixture may be optionally stirred at intervals to achieve better results.

Preferably, in step (e) the mixture may be optionally stirred at intervals wherein said mixture is stirred for approximately 5% 10%, 15%, 20%, 25%, 30%, 35%, 40%, 45%, 50%, 55%, 60%, 65%, 70%, 75%, 80%, 85%, 90% or 95% of the total period of time.

Preferably, in step (e) the mixture may be optionally stirred at intervals wherein said mixture is stirred approximately every 1 minute for 30 seconds, every 2 minutes for 30 seconds, every 3 minutes for 30 seconds, every 4 minutes for 30 seconds, every 5 minutes for 30 seconds, 6 minute for 30 seconds, every 7 minutes for 30 seconds, every 8 minutes for 30 seconds, every 9 minutes for 30 seconds, every 10 minutes for 30 seconds, every 2 minutes for 60 seconds, every 3 minutes for 60 seconds, every 4 minutes for 60 seconds, every 5 minutes for 60 seconds, 6 minute for 60 seconds, every 7 minutes for 60 seconds, every 8 minutes for 60 seconds, every 9 minutes for 60 seconds, every 10 minutes for 60 seconds, every 2 minutes for 90 seconds, every 3 minutes for 90 seconds, every 4 minutes for 90 seconds, every 5 minutes for 90 seconds, 6 minute for 90 seconds, every 7 minutes for 90 seconds, every 8 minutes for 90 seconds, every 9 minutes for 90 seconds, every 10 minutes for 90 seconds, every 3 minutes for 120 seconds, every 4 minutes for 120 seconds, every 5 minutes for 120 seconds, 6 minute for 120 seconds, every 7 minutes for 120 seconds, every 8 minutes for 120 seconds, every 9 minutes for 120 seconds, every 10 minutes for 120 seconds, every 12.5 minutes for 120 seconds, every 15 minutes for 120 seconds, every 4 minutes for 180 seconds, every 5 minutes for 180 seconds, 6 minute for 180 seconds, every 7 minutes for 180 seconds, every 8 minutes for 180 seconds, every 9 minutes for 180 seconds, every 10 minutes for 180 seconds, every 12.5 minutes for 180 seconds, every 17.5 minutes for 180 seconds, every 20 minutes for 180 seconds, every 15 minutes for 180 seconds, every 4 minutes for 180, every 5 minutes for 180 seconds, 6 minute for 180 seconds, every 7 minutes for 180 seconds, every 8 minutes for 180 seconds, every 9 minutes for 180 seconds, every 10 minutes for 180 seconds, every 12.5 minutes for 180 seconds, every 17.5 minutes for 180 seconds, every 20 minutes for 180 seconds, every 25 minutes for 180 seconds, every 4 minutes for 210, every 5 minutes for 210 seconds, 6 minute for 210 seconds, every 7 minutes for 210 seconds, every 8 minutes for 210 seconds, every 9 minutes for 210 seconds, every 10 minutes for 210 seconds, every 12.5 minutes for 210 seconds, every 15 minutes for 210 seconds, every 17.5 minutes for 210 seconds, every 20 minutes for 210 seconds, every 25 minutes for 210 seconds, every 7 minutes for 300 seconds, every 8 minutes for 300 seconds, every 9 minutes for 300 seconds, every 10 minutes for 300 seconds, every 12.5 minutes for 300 seconds, every 15 minutes for 300 seconds, every 17.5 minutes for 300 seconds, every 20 minutes for 300 seconds, every 25 minutes for 300 seconds, every 9 minutes for 300 seconds, every 10 minutes for 420 seconds, every 12.5 minutes for 420 seconds, every 15 minutes for 420 seconds, every 17.5 minutes for 420 seconds, every 20 minutes for 420 seconds, every 25 minutes for 420 seconds, every 30 minutes for 420 seconds, every 10 minutes for 540 seconds, every 12.5 minutes for 540 seconds, every 15 minutes for 540 seconds, every 17.5 minutes for 540 seconds, every 20 minutes for 540 seconds, every 25 minutes for 540 seconds, every 30 minutes for 540 seconds, every 12.5 minutes for 10 minutes, every 15 minutes for 10 minutes, every 17.5 minutes for 10 minutes, every 20 minutes for 10 minutes, every 25 minutes for 10 minutes, every 30 minutes for 10 minutes, every 15 minutes for 12.5 minutes, every 17.5 minutes for 15 minutes, every 20 minutes for 15 minutes, every 25 minutes for 15 minutes, every 30 minutes for 12.5 minutes, every 45 minutes for 15 minutes, every 17.5 minutes for 12.5 minutes, every 20 minutes for 15 minutes, every 25 minutes for 12.5 minutes, every 30 minutes for 15 minutes, every 45 minutes for 15 minutes, every 25 minutes for 15 minutes, every 30 minutes for 12.5 minutes, every 45 minutes for 15 minutes, every 25 minutes for 20 minutes, every 30 minutes for 20 minutes, every 45 minutes for 20 minutes, every 30 minutes for 25 minutes, every 45 minutes for 25 minutes, or every 45 minutes for 30 minutes.

Step (h) may be cooled by (1) allowing mixture to air cool by placing cooling liquid at ambient room temperature; (2) accelerating the cooling process by having the material cooled via a cooling jacket surrounding the mixture with an appropriate apparatus at a temperature between −20 and 70 F; or (3) accelerating the cooling process by reducing the heat of the cooling liquid gradually over a period of time, whereby the ambient room temperature surrounding the mixture is gradually lowered over time.

The press used in step (j) of the process described above may be any press any press able to supply enough force to extract the attributes from the materials, but is preferably a hydraulic press.

This application also describes a machine group supporting semi-automated processing of plant material for desired molecular compounds for use in consumables and topical salves comprising: (a) a cooking vessel adapted to contain plant material and a consumable organic solvent, the cooking vessel having a heating cooling jacket formed by a double wall; (b) a mixture stirring apparatus mounted over the cooking vessel and extending into the cooking vessel for automated stirring of the plant material in the consumable solvent; (c) a first fluid reservoir separate from but connected for circulation by pump to the heating and cooling jacket of the cooking vessel, the first fluid reservoir adapted to contain a heat transfer fluid; (d) at least one inline heating device connected in the circulation path for heating the transfer oil; (e) a heat exchange apparatus connected to the heat transfer oil circulation loop via ingress and egress valves and associated transfer lines, the valves controllable to open or close; (f) a second fluid reservoir separate from but connected for circulation by pump to the heat exchanger, and (g) a chilling unit connected to the second reservoir for circulation by pump, the chilling unit functioning to lower the temperature of the transfer oil.

This application describes another process for extracting organic molecular compounds from any plant material and concentrating those into a viscous oil comprising steps: (a) heat plant material in an oven to a temperature between 10° and 275° F., for a period of time between 15 minutes and 240 minutes, which may be based on the moisture content of the material used at that time; (b) optionally grind the flower to smaller particle; (c) mix the plant material with a solvent (carrier agent) to create a mixture; (d) heat the mixture in a vessel, wherein said vessel may be an embodiment of any apparatus described herein, any type of oven, a crock pot, or a vessel akin to a crock pot, or by any other means known in the art to a temperature between 10° and 275° F., for a period of time to evenly heat the mixture for a particular batch size; (e) allow the mixture to cool to 60-80° F. or approximately room temperature over a period of time, which varies depending on process of cooling; and (f) remove the plant material from the mixture, leaving a first extract with the solvent and extracted compounds.

The process described above may optionally continue with the following steps: (g) place the plant material into a heated or non-heated press, wherein said plant material has a temperature that is approximately the same as the temperature described in step (e); (h) press the plant material using said heated press or non-heated press having enough force to create a second extract with the solvent and extracted compounds from the plant material; and (i) combine the first extract and the second extract.

The process described above may optionally continue with the following steps: (j) optionally combine the first extract and second extract with additional solvent to achieve the desired volume; (k) place said first extract, said second extract and said solvent from step (j) into a vessel with new additional plant material; (l) optionally repeat steps (c) through (e) as times as needed to maximize the beneficial qualities being extracted from the plant material and/or to get the precise level(s) of desired compound(s); (m) repeat steps (c)-(i); and (n) combine all extracts into one final product.

Alternatively, the process described above may optionally continue with alternate steps for (j) through (m) as follows: (j) optionally combine the first extract and second extract with additional solvent to achieve the desired volume; (k) place said first extract, said second extract and said solvent from step (j) into a vessel with new additional plant material; (l) optionally repeat steps (c) through (i) as times as needed to maximize the beneficial qualities being extracted from the plant material and/or to get the precise level(s) of desired compound(s); and (m) combine all extracts into one final product.

Alternatively, the process described above may optionally continue with alternate steps for (j) through (n) as follows: (j) optionally combine the first extract and second extract with additional solvent to achieve the desired volume; (k) place said first extract, said second extract and said solvent from step (j) into a vessel with new additional plant material; (l) optionally repeat steps (c) through (e) as times as needed to maximize the beneficial qualities being extracted from the plant material and/or to get the precise level(s) of desired compound(s); and (m) repeat steps (d)-(i); and (n) combine all extracts into one final product.

Alternatively, the process described above may optionally continue with alternate steps for (j) through (n) as follows: (j) optionally combine the first extract and second extract with additional solvent to achieve the desired volume; (k) place said first extract, said second extract and said solvent from step (j) into a vessel with new additional plant material; (l) optionally repeat steps (c) through (i) as times as needed to maximize the beneficial qualities being extracted from the plant material and/or to get the precise level(s) of desired compound(s); and (m) repeat steps (d)-(i); and (n) combine all extracts into one final product.

Steps (c) through (e) may be repeated as many as times as needed to maximize the beneficial qualities being extracted from the plant material and/or to get the precise level(s) of desired compound(s)

Steps (c) through (e) may be repeated as many as times as needed to maximize the beneficial qualities being extracted from the plant material and/or to get the precise level(s) of desired compound(s), wherein preferably steps (c) and (e) may be repeated between 2 and 12 times to maximize the beneficial qualities being extracted from the plant material and/or to get the precise level(s) of desired compound(s), and wherein more preferably steps (c) and (e) may be repeated 4, 5, 6, 7, 8, 9, or 10 times to maximize the beneficial qualities being extracted from the plant material and/or to get the precise level(s) of desired compound(s).

Steps (c) through (i) may be repeated as many as times as needed to maximize the beneficial qualities being extracted from the plant material and/or to get the precise level(s) of desired compound(s)

Steps (c) through (i) may be repeated as many as times as needed to maximize the beneficial qualities being extracted from the plant material and/or to get the precise level(s) of desired compound(s), wherein preferably steps (c) and (i) may be repeated between 2 and 12 times to maximize the beneficial qualities being extracted from the plant material and/or to get the precise level(s) of desired compound(s), and wherein more preferably steps (c) and (i) may be repeated 4, 5, 6, 7, 8, 9, or 10 times to maximize the beneficial qualities being extracted from the plant material and/or to get the precise level(s) of desired compound(s).

Steps (d) through (k) as many as times as needed to maximize the beneficial qualities being extracted from the plant material and/or to get the precise level(s) of desired compound(s).

Steps (d) through (k) as many as times as needed to maximize the beneficial qualities being extracted from the plant material and/or to get the precise level(s) of desired compound(s), and wherein preferably steps (d) and (k) may be repeated between 2 and 12 times to maximize the beneficial qualities being extracted from the plant material and/or to get the precise level(s) of desired compound(s), and wherein more preferably steps (d) and (k) may be repeated 4, 5, 6, 7, 8, 9, or 10 times to maximize the beneficial qualities being extracted from the plant material and/or to get the precise level(s) of desired compound(s).

Said new additional plant material may optionally be processed as described in steps (a) and (b) in any embodiment of the processes described herein.

The oven used in step (a) of the process described above may be any type of oven including but not limited to a standard oven, a convection oven or a vacuum oven.

The temperature of step (a) may be a range selected from the group consisting of 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-

210, 210-215, 215-220, 220-225, 225-230, 230-235, 235-240, 240-245, 245-250, 250-255, 255-260, 260-265, 265-270, and 270-275° F.

Alternatively, the temperature of step (a) may be a range selected from the group consisting of 220-221, 222-223, 224-225, 226-227, 228-229, 230-231, 232-233, 234-235, 236-237, 238-239, 240-241, 242-243, 244-245, 246-247, 248-249, 250-251, 252-253, 254-255, 256-257, 258-259, 260-261, 262-263, 264-265, 266-267, 268-269, 270-271, 272-273, and 274-275° F.

More preferably the temperature of step (a) may be a selected from the group consisting of 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, and 275° F.

The period of time in step (a) may be a range selected from the group consisting of 15-20, 20-25, 25-30, 30-35, 35-40, 40-45, 45-50, 50-55, 55-60, 60-65, 65-70, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240 minutes.

Alternatively, the period of time of step (a) may be a selected from the group consisting of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239 and 240 minutes.

The solvent (carrier agent) of step (c) may be any solvent defined herein, any solvent known to one of skill in the art or any organic solvent and is more preferable is selected from a group consisting of propylene glycol, vegetable glycerin, a food grade vegetable glycerin or a non-GMO glycerin, or non-GMO vegetable oil.

The mixture of step (c) preferably does not contain any air bubbles or pockets.

The temperature of the mixture in step (d) may be a range selected from the group consisting of 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240, 240-245, 245-250, 250-255, 255-260, 260-265, 265-270, and 270-275° F.

Alternatively, the temperature of the mixture in step (d) may be a range selected from the group consisting of 100-101, 102-103, 104-105, 106-107, 108-109, 110-111, 112-113, 114-115, 116-117, 118-119, 120-121, 122-123, 124-125, 126-127, 128-129, 130-131, 132-133, 134-135, 136-137, 138-139, 140-141, 142-143, 144-145, 146-147, 148-149, 150-151, 152-153, 154-155, 156-157, 158-159, 160-161, 162-163, 164-165, 166-167, 168-169, 170-171, 172-173, 174-175, 176-177, 178-179, 180-181, 182-183, 184-185, 186-187, 188-189, 190-191, 192-193, 194-195, 196-197, 198-199, 200-201, 202-203, 204-205, 206-207, 208-209, 210-211, 212-213, 214-215, 216-217, 218-219, 220-221, 222-223, 224-225, 226-227, 228-229, 230-231, 232-233, 234-235, 236-237, 238-239, 240-241, 242-243, 244-245, 246-247, 248-249, 250-251, 252-253, 254-255, 256-257, 258-259, 260-261, 262-263, 264-265, 266-267, 268-269, 270-271, 272-273, and 274-275° F.

More preferably the temperature of the mixture step (d) may be a selected from the group consisting of 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, and 275° F.

The period of time in step (d) may be a range selected from the group consisting of 15-20, 20-25, 25-30, 30-35, 35-40, 40-45, 45-50, 50-55, 55-60, 60-65, 65-70, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240 minutes.

Alternatively, the period of time of step (d) may be a selected from the group consisting of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239 and 240 minutes.

Step (d) may optionally be done with stirring intermittently or continuously stirring depending on the product composition for a period of time dependent on material and batch size.

In step (d) the mixture may be optionally stirred continuously.

Alternatively, in step (d) the mixture may be optionally stirred at intervals to achieve better results.

Preferably, in step (d) the mixture may be optionally stirred at intervals wherein said mixture is stirred for approximately 5% 10%, 15%, 20%, 25%, 30%, 35%, 40%, 45%, 50%, 55%, 60%, 65%, 70%, 75%, 80%, 85%, 90% or 95% of the total period of time.

Preferably, in step (d) the mixture may be optionally stirred at intervals wherein said mixture is stirred approximately every 1 minute for 30 seconds, every 2 minutes for 30 seconds, every 3 minutes for 30 seconds, every 4 minutes for 30 seconds, every 5 minutes for 30 seconds, 6 minute for 30 seconds, every 7 minutes for 30 seconds, every 8 minutes for 30 seconds, every 9 minutes for 30 seconds, every 10 minutes for 30 seconds, every 2 minutes for 60 seconds, every 3 minutes for 60 seconds, every 4 minutes for 60 seconds, every 5 minutes for 60 seconds, 6 minute for 60 seconds, every 7 minutes for 60 seconds, every 8 minutes for 60 seconds, every 9 minutes for 60 seconds, every 10 minutes for 60 seconds, every 2 minutes for 90 seconds, every 3 minutes for 90 seconds, every 4 minutes for 90 seconds, every 5 minutes for 90 seconds, 6 minute for 90 seconds, every 7 minutes for 90 seconds, every 8 minutes for 90 seconds, every 9 minutes for 90 seconds, every 10 minutes for 90 seconds, every 3 minutes for 120 seconds, every 4 minutes for 120 seconds, every 5 minutes for 120 seconds, 6 minute for 120 seconds, every 7 minutes for 120 seconds, every 8 minutes for 120 seconds, every 9 minutes for 120 seconds, every 10 minutes for 120 seconds, every 12.5 minutes for 120 seconds, every 15 minutes for 120 seconds, every 4 minutes for 180 seconds, every 5 minutes for 180 seconds, 6 minute for 180 seconds, every 7 minutes for 180 seconds, every 8 minutes for 180 seconds, every 9 minutes for 180 seconds, every 10 minutes for 180 seconds, every 12.5 minutes for 180 seconds, every 17.5 minutes for 180 seconds, every 20 minutes for 180 seconds, every 15 minutes for 180 seconds, every 4 minutes for 180, every 5 minutes for 180 seconds, 6 minute for 180 seconds, every 7 minutes for 180 seconds, every 8 minutes for 180 seconds, every 9 minutes for 180 seconds, every 10 minutes for 180 seconds, every 12.5 minutes for 180 seconds, every 15 minutes for 180 seconds, every 17.5 minutes for 180 seconds, every 20 minutes for 180 seconds, every 25 minutes for 180 seconds, every 4 minutes for 210, every 5 minutes for 210 seconds, 6 minute for 210 seconds, every 7 minutes for 210 seconds, every 8 minutes for 210 seconds, every 9 minutes for 210 seconds, every 10 minutes for 210 seconds, every 12.5 minutes for 210 seconds, every 15 minutes for 210 seconds, every 17.5 minutes for 210 seconds, every 20 minutes for 210 seconds, every 25 minutes for 210 seconds, every 7 minutes for 300 seconds, every 8 minutes for 300 seconds, every 9 minutes for 300 seconds, every 10 minutes for 300 seconds, every 12.5 minutes for 300 seconds, every 15 minutes for 300 seconds, every 17.5 minutes for 300 seconds, every 20 minutes for 300 seconds, every 25 minutes for 300 seconds, every 9 minutes for 300 seconds, every 10 minutes for 420 seconds, every 12.5 minutes for 420 seconds, every 15 minutes for 420 seconds, every 17.5 minutes for 420 seconds, every 20 minutes for 420 seconds, every 25 minutes for 420 seconds, every 30 minutes for 420 seconds, every 10 minutes for 540 seconds, every 12.5 minutes for 540 seconds, every 15 minutes for 540 seconds, every 17.5 minutes for 540 seconds, every 20 minutes for 540 seconds, every 25 minutes for 540 seconds, every 30 minutes for 540 seconds, every 12.5 minutes for 10 minutes, every 15 minutes for 10 minutes, every 17.5 minutes for 10 minutes, every 20 minutes for 10 minutes, every 25 minutes for 10 minutes, every 30 minutes for 10 minutes, every 15 minutes for 12.5 minutes, every 17.5 minutes for 15 minutes, every 20 minutes for 15 minutes, every 25 minutes for 15 minutes, every 30 minutes for 12.5 minutes, every 45 minutes for 15 minutes, every 17.5 minutes for 12.5 minutes, every 20 minutes for 15 minutes, every 25 minutes for 12.5 minutes, every 30 minutes for 15 minutes, every 45 minutes for 15 minutes, every 25 minutes for 15 minutes, every 30 minutes for 12.5 minutes, every 45 minutes for 15 minutes, every 25 minutes for 20 minutes, every 30 minutes for 20 minutes, every 45 minutes for 20 minutes, every 30 minutes for 25 minutes, every 45 minutes for 25 minutes, or every 45 minutes for 30 minutes.

Step (e) may be cooled by any mean known in the art including but not limited to being cooled by (1) using an embodiment of any apparatus described herein; (2) allowing mixture to air cool by placing the mixture in a room at ambient room temperature; (3) accelerating the cooling process by having the material cooled via a cooling jacket surrounding the mixture with an appropriate apparatus; (4) accelerating the cooling process by reducing the ambient temperature or placing the mixture into a cooling room, refrigerator, freezer, blast freezer, or by other cooling means; or (5) accelerating the cooling process by reducing the heat gradually over a period of time, whereby the ambient room temperature surrounding the mixture is gradually lowered over time.

Preferably, in step (e) plant material may be cooled by removing it from heat and placing said plaint material in a cooling room, wherein the temperature is at a range between 45 and −15, a refrigerator, wherein the temperature of the refrigerator is at a range between 2° and 45° F., in a freezer, wherein the temperature of the freezer is at a range between −5 and 15° F. or in a blast freezer, wherein the temperature of the blast freezer is at a range between 14-184° F.

In step (e) the plant material may be cooled to a temperature range selected from the group consisting of 60-65, 65-70, 70-75, and 75-80° F.

Alternatively, in step (e) the plant material may be cooled to a temperature range selected from the group consisting of 60-61, 62-63, 64-65, 66-67, 67-68, 68-69, 69-70, 70-71, 71-72, 7374, 75-76, 77-78, and 79-80° F.

Preferably in step (e) the plant material may be cooled to a temperature selected from the group consisting of 60, 61, 62, 63, 64, 65, 66, 67, 68, 69, 70, 71, 72, 73, 74, 75, 76, 77, 78, 79 and 80° F.

The period of time in step (e) may be a range selected from the group consisting of 15-20, 20-25, 25-30, 30-35, 35-40, 40-45, 45-50, 50-55, 55-60, 60-65, 65-70, 70-75, 75-80, 80-85, 85-120, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205, 205-210, 210-215, 215-220, 220-225, 225-230, 230-235, 235-240 minutes.

Alternatively, the period of time of step (e) may be a selected from the group consisting of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239 and 240 minutes.

The press used in any process described herein, may be any press able to supply enough force to extract the attributes from the materials, but is preferably a hydraulic press.

The press used in any process described above, or any other process described herein, may be any press able to supply 800-2000 pounds of pressure per 5″ square.

The press used in any process described above, or any other process described herein, may be any press able to supply 1000-1500 pounds of pressure per 5″ square.

Preferably, the press used in any process described above, or any other process described herein, may be any press able to supply 1000 pounds of pressure per 5″ square.

The plant material used in any process described herein may be dried (dried by air-drying, or vacuum drying, or any other technique known to one of skill in the art), trimmed, ground, and/or broken into small portions prior to step (a). The plant material used in any process described herein preferably hemp or *cannabis* having substantial CBD levels or low THC levels.

In a preferred embodiment any process described herein uses a ratio of 0.5-2 ounce by weight of plant material to 40-200 mL of solvent (carrier agent) in the mixture or 40-200 mL of solvent combined with first extract and/or second extract, and more preferably a ratio of approximately 1 ounce by weight of plant material to 1900-2100 mL of solvent (carrier agent) in the mixture or 1900-2100 mL of solvent combined with first extract and/or second extract.

BRIEF DESCRIPTION OF THE SEVERAL VIEWS OF THE DRAWINGS

FIG. 5A is a collection of test results depicting amounts of desired molecular compounds extracted and recovered from a sample processed 2 times using the process of FIG. 2 and supporting equipment group of FIG. 1.

FIG. 5B is a collection of test results depicting amounts of desired molecular compounds extracted and recovered from a sample processed 3 times using the process of the present invention.

DETAILED DESCRIPTION OF THE INVENTION

Figure 1:
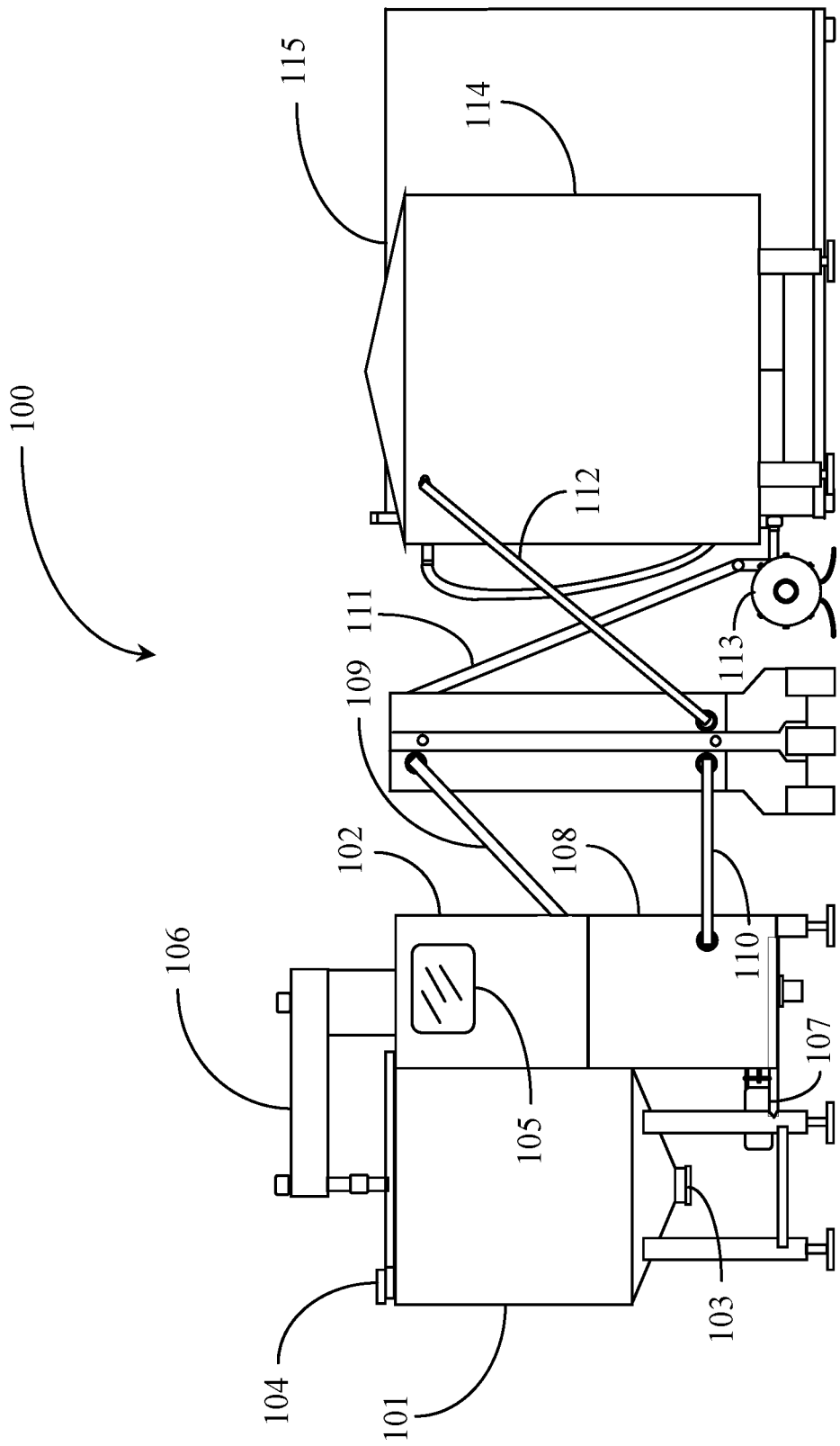
FIG. 1 is an elevation view of a closed loop equipment group supporting a commercial extraction process of primary cannabinoids like CBD and other molecular compounds from raw plant material for medicinal use.

Definitions.

Before describing the embodiments, it should be noted that it is not limited to herein described methods and experimental conditions, as well as the terminology used herein for describing particular embodiments is not intended to be limiting. Unless defined otherwise, all technical and scientific terms used herein have the meaning as commonly understood by one of ordinary skill in the art to which this invention pertains. Although any methods and materials similar or equivalent to those described herein can be used in the practice or testing of the invention, particular methods and materials are now described.

As used herein, the following terms and phrases shall have the meanings set forth below. Unless defined otherwise, all technical and scientific terms used herein have the same meaning as commonly understood to one of ordinary skill in the art.

The term "plant materials" or "plant material" shall include hemp plants, *cannabis* plants, or flowers, buds, or plant parts from any genus or species of known plant. This term may be interchangeably with the terms "material(s)," "organic material(s)" or "botanical material(s)" herein.

As used herein, the term "plant part" refers to any part of a plant including but not limited to the embryo, shoot, root, stem, seed, stipule, leaf, petal, flower bud, flower, ovule, bract, trichome, branch, petiole, internode, bark, pubescence, tiller, rhizome, frond, blade, ovule, pollen, stamen, and the like. The two main parts of plants grown in some sort of media, such as soil or vermiculite, are often referred to as the "above-ground" part, also often referred to as the "shoots", and the "below-ground" part, also often referred to as the "roots". Plant parts may also include certain extracts such as kief, which includes *cannabis* trichomes or glands.

The term "raw plant materials" or "raw materials" shall mean any unprocessed plant materials.

The term "hemp plants" as used herein, refers to plants in the genus of *cannabis* plants derived thereof, which contain a low amount of THC, typically containing less than 0.3% THC. Hemp plants are typically produced via asexual reproduction and via seed production.

The term "*cannabis* plants" as used herein, refers to plants in the genus of *cannabis* and plants derived thereof. Such as *cannabis* plants produced via asexual reproduction and via seed production.

The terms "variety," or "strain" are used interchangeably herein and mean a type of specialty *cannabis* or hemp that share a uniform morphological or physiological character, or more specifically means a plant grouping within a single botanical taxon of the lowest known rank, which grouping, irrespective of whether the conditions for the grant of a breeder's right are fully met, can be i) defined by the expression of the characteristics resulting from a given genotype or combination of genotypes, ii) distinguished from any other plant grouping by the expression of at least one of the said characteristics and iii) considered as a unit with regard to its suitability for being propagated unchanged.

The term "hemp" used alone, without a modified noun, means hemp compounds, hemp plants, hemp plant parts, raw hemp flower, hemp extracts or hemp compositions.

The term "*cannabis*" used alone, without a modified noun, means *cannabis* compounds, *cannabis* plants, *cannabis* plant parts, raw *cannabis* flower, *cannabis* extracts or *cannabis* compositions.

The term "product" means consumable plant material in any known form including but not limited to plant part, extract, edible, oil, tincture, salve, e-cigarettes liquid, and hash.

The term "extract" is created by processing any raw materials to extract and concentrate compounds contained within the raw material such as cannabinoids or terpenes. It should be noted that some, but not all, methods of processing of cannabis or hemp into an extract change the terpene and cannabinoid profile of the original cannabis, such that the cannabis extract has a slightly altered cannabinoid profile.

The term "tincture" shall mean an extract of a plant material dissolved in, or mixed with, ethanol, any high proof alcohol (including but not limited to brandy, vodka, whiskey, rum, and gin), sugar alcohols (including but not limited to mannitol, sorbitol, xylitol, lactitol, isomalt, maltitol and hydrogenated starch hydrolysates), alpha hydroxy acids (including but not limited to include glycolic acid, lactic acid, citric acid, and mandelic acid), vinegar, propylene glycol, diethylene glycol, any grade of glycerol made from any source (preferably a vegetable glycerin, a food grade vegetable glycerin or a non-GMO glycerin), corn syrup, maple syrup, honey, sorbitol, mannitol, vegetable oil (including but not limited to canola oil, palm oil, coconut oil, soybean oil, rapeseed oil, olive oil), water, or any combination thereof, and which is preferably administered sublingually, but may be administered orally or by other similar means.

The term "salve" shall mean an extract of a plant material dissolved in, or mixed with, ethanol, sugar alcohols (including but not limited to mannitol, sorbitol, xylitol, lactitol, isomalt, maltitol and hydrogenated starch hydrolysates), alpha hydroxy acids (including but not limited to include glycolic acid, lactic acid, citric acid, and mandelic acid), vinegar, propylene glycol, diethylene glycol, butylene glycol, ceramides, hyaluronic acid, urea, glycerol made from any source (preferably a vegetable glycerin, a food grade vegetable glycerin or a non-GMO glycerin), corn syrup, maple syrup, honey, vegetable oil (including but not limited to canola oil, palm oil, coconut oil, soybean oil, rapeseed oil, olive oil), water, or any combination thereof, and which is preferably administered topically to the skin, but may be administered by other similar means.

The term "cannabinoid profile" means the ratio by weight of cannabinoids and/or terpenes in cannabis or hemp plants, plant parts, extracts or compositions.

The term "cannabinoid compounds" shall mean cannabinoids, terpenes or a mixture thereof, which may be found in cannabis plants or hemp plants.

The terms "cannabinoids" and "terpenes" include all known and unknown isomers, stereoisomers, diastereomers, and enantiomers of each, including those that are synthetic manufactured or naturally occurring in cannabis plants or plant parts.

Cannabinoids are a class of diverse chemical compounds that activate cannabinoid receptors in mammals. Cannabinoids produced by plants are called phytocannabinoids, a.k.a., natural cannabinoids, herbal cannabinoids, and classical cannabinoids. At least 85 different cannabinoids have been isolated from the cannabis plants (El-Alfy et al., 2010, "Antidepressant-like effect of delta-9-tetrahydrocannabinol and other cannabinoids isolated from Cannabis sativa L", Pharmacology Biochemistry and Behavior 95 (4): 434-42; Brenneisen, supra). Typical cannabinoids isolated from cannabis plants include, but are not limited to, THC ($\Delta^9$-Tetrahydrocannabinol), CBD (Cannabidiol), CBG (Cannabigerol), CBC (Cannabichromene), CBL (Cannabicyclol), CBV (Cannabivarin), THCV ($\Delta^9$-Tetrahydrocannabivarin), CBDV (Cannabidivarin), CBCV (Cannabichromeovarin), CBGV (Cannabigerovarin), and CBGM (Cannabigerol Monomethyl Ether). These are discussed in more depth below.

In typical hemp strains, the predominant naturally occurring cannabinoid is cannabidiol (CBD).

In the more common cannabis strains, the principle cannabinoids present in cannabis are the cannabinoid acids $\Delta^9$-tetrahydrocannabinolic acid (THCA), and cannabidiolic acid (CBDA), with small amounts of the corresponding neutral cannabinoids, respectively $\Delta^9$ tetrahydrocannabinol (THC) and cannabidiol (CBD).

In addition to these principle cannabinoids, cannabis typically contains other minor cannabinoids including but not limited to those listed above, and some of which are described herein. Other cannabinoids may be intermediates in the biosynthesis of the major cannabinoids and hence exist at only low levels in the plant as they are constantly undergoing further biotransformation once they are formed. An example of such a cannabinoid is cannabigerol (CBG). Other minor cannabinoids may represent the end point of an alternative biosynthetic pathway to that leading to the formation of the major cannabinoids, THC and CBD. These cannabinoids are frequently relatively more abundant in the plant, an example being cannabichromene (CBC).

Common naturally occurring cannabinoids may include; Tetrahydrocannabinol (THC), Tetrahydrocannabivarin (THCV, THV), Cannabidivarin (CBDV), Cannabigerol (CBG), Cannabidiolic acid CBDA-$C_3$, Cannabidivaric-$C_3$, and Cannabidol (CBD).

In addition to cannabinoids, cannabis and hemp contain dozens of terpene compounds. Terpenes are a large and diverse class of organic compounds, produced by a variety of plants. They are often strong smelling and thus may have had a protective function. Terpenes are derived biosynthetically from units of isoprene, which has the molecular formula $C_5H_8$. Cannabis plants produce at over 120 different terpenes at different levels in their trichomes. Age, maturation and time of day can affect the amount and ratios of terpenes. Climate and weather also affect terpenes and flavonoid production.

In addition to many circulatory and muscular effects, some terpenes interact with neurological receptors. A few terpenes produced by cannabis plants also bind weakly to cannabinoid receptors. Some terpenes can alter the permeability of cell membranes and allow in either more or less cannabinoids, while other terpenes can affect serotonin and dopamine receptors as neurotransmitters.

Some common terpenes found in cannabis, at detectable levels, include but are not limited to, camphene, carene, β-caryophyllene, caryophyllene oxide, fenchol, guaiol,
    α-humulene, limonene, linalool, myrcene, nerolidol, β-ocimene, α-phelladrene, phytol, α-pinene, β-pinene, pinoline, γ-terpinene, α-terpinene, α-terpineol, and terpinolene.

Terpenes have been shown to have their own medicinal qualities as well as synergistic effects with cannabinoids. This is known as the entourage effect and is generally considered to result in plants providing advantages over only using the natural products that are isolated from them (Russo 2011, Taming THC: potential cannabis synergy and phyto-cannabinoid-terpenoid entourage effects, British Journal of Pharmacology, 163:1344-1364).

More recently it has been discovered that there are many more cannabinoids in cannabis that could be isolated and preserved in quantity. In addition, there are discovered terpenes such as linalool, myrcene, among others that are also now receiving focus in the industry as separate sources for additional desired medical efficacies. β-caryophyllene is often a predominant terpene found in cannabis. It is a selective full agonist at the $CB_2$ receptor, which makes it the only phytocannabinoid found outside the cannabis genus. In addition, it has anti-inflammatory and gastric cytoprotective properties, and may even have anti-malarial activity.

TABLE 2

A non-limiting list of the medical effects of some of the most common terpenes found.

| Terpenoid | Odor Description | Flavor Description | Suggested Pharmacology |
|---|---|---|---|
| α-pinene | Herbal, piney | Woody, piney, camphoraceous | Anti-inflammatory, bronchodilator, stimulant |
| camphene | Woody, piney | Camphoraceous, cooling, minty | Reduces plasma cholesterol and triglycerides, Antioxidant and free radical scavenger |
| β-pinene | Herbal, cooling, piney | Fresh, piney, woody | Strong antimicrobial |
| myrcene | Spicy, herbaceous | Woody, vegetative, citrus | Anti-inflammatory, sedative, antibiotic, analgesic |
| α-phellandrene | Terpenic, citrus | Terpenic, citrus, lime | Antinociceptive |
| carene | Citrus, sweet | None given | CNS depressant, anti-inflammatory |
| α-terpinene | Woody, citrus, medicinal | Terpenic, woody, piney | Antioxidant |
| limonene | Citrus, fresh | Sweet, orange, citrus | Anxiolytic, antidepressant, immunostimulant |
| β-ocimene | Floral, green | Green, tropical, woody | Possible anti-bacterial |
| γ-terpinene | Terpenic, woody | Terpenic, citrus, lime-like | Antioxidant |
| terpinolene | Herbal, woody | Sweet, fresh, piney, citrus | Comforting, calming, antioxidant, antifungal |
| linalool | Floral, citrus | Citrus, orange, lemon, floral | Sedative, anxiolytic, immunostimulant |
| fenchol | Camphor, piney | Fresh, piney | Possible stimulant |
| α-terpineol | Floral, piney | None given | Sedative, AChE inhibitor, antioxidant |
| β-caryophyllene | Spicy, woody | Spicy, clove, rosemary | Selective agonist of $CB_2$ receptor, anti-inflammatory, antimalarial |
| α-humulene | Woody | None given | Anti-inflammatory |
| caryophyllene oxide | Woody, sweet | None given | Antifungal, stimulant |

Compounds that have the same molecular formula but differ in the nature or sequence of bonding of their atoms or the arrangement of their atoms in space are termed "isomers." Isomers that differ in the arrangement of their atoms in space are termed "stereoisomers." "Diastereomers" are stereoisomers with opposite configuration at one or more chiral centers which are not enantiomers. Stereoisomers bearing one or more asymmetric centers that are non-superimposable mirror images of each other are termed "enantiomers."

A "substantially pure" composition, mixture or extract of cannabinoid is defined as a preparation having a chromatographic purity (of the desired cannabinoid) of greater than 90%, more preferably greater than 95%, more preferably greater than 96%, more preferably greater than 97%, more preferably greater than 98%, more preferably greater than 99% and most preferably greater than 99.5%, as determined by HPLC.

The term "substantially free" can be taken to mean that no cannabinoids other than the target cannabinoid are detectable by HPLC.

The term "organic solvent" or "organic solvents" shall mean ethanol, any high proof alcohol (including but not limited to brandy, vodka, whiskey, rum, and gin), sugar alcohols (including but not limited to mannitol, sorbitol, xylitol, lactitol, isomalt, maltitol and hydrogenated starch hydrolysates), alpha hydroxy acids (including but not limited to include glycolic acid, lactic acid, citric acid, and mandelic acid), vinegar, propylene glycol, diethylene glycol, butylene glycol, ceramides, hyaluronic acid, urea, glycerol made from any source (preferably a vegetable glycerin, a food grade vegetable glycerin or a non-GMO glycerin), corn syrup, maple syrup, honey, vegetable oil (including but not limited to canola oil, palm oil, coconut oil, soybean oil, rapeseed oil, olive oil), water, or any combination thereof. The organic solvents are preferably food grade and non-GMO.

The term "heat transfer oil" shall mean hydrocarbon oils, glycol, propylene glycol, diethylene glycol, butylene glycol, glycerin, silicone transfer oils, water, any other transfer fluid known in the art, or any combination thereof.

Detailed Embodiments

In various embodiments described enabling detail herein, the inventor provides a unique process supported by equipment for isolating, concentrating and preserving complex molecular compounds for use in medicinal or recreational products. The present invention is described using the following examples, which may describe more than one relevant embodiment falling within the scope of the invention.

A goal of the present invention is to secure a solvent means for extracting at least CBD from botanical materials that is non-toxic, has a characteristic of protecting organic molecular compounds from molecular breakdown due to oxidation, and can be included in the final product as a carrier base. A further goal of the present invention is to have a process means that is automated to an extent that a complete molecular compound isolation and extraction process may be performed using commercial grade equipment in a closed loop extraction system.

A further goal of the present invention is to secure a means for isolating, concentrating, and preserving certain molecular compounds from organic materials in a manner that provides rich presence of the primary and desired compounds in a final product.

FIG. 1 is an elevation view of a closed-loop equipment group 100 supporting a commercial extraction process to extract primary cannabinoids like CBD and other molecular compounds from raw organic material for medicinal use. Equipment group 100 includes a commercial grade process vessel 101 designed by the inventors and adapted to house a mixture of raw material and a carrier oil described hereinafter in this specification as a solvent used to extract compounds and as a carrier oil in the extract. In a preferred embodiment, the solvent and carrier oil may be a consumable food grade organic vegetable glycerin oil. Process vessel 101 is provided by the inventors to mix the solvent and raw materials for repeated cooking and cooling cycles. Process vessel 101 is the beginning point in equipment grouping 100 where prepared raw organic material, hemp in this example, may be placed inside and mixed with the organic solvent.

The inventors have determined that there may be other solvents used that are adapted to remove the CBD from the flower and that are consumable. Examples may include but are not limited to olive oil, palm oil, soybean oil, canola oil (rapeseed oil), corn oil, peanut oil and other vegetable oils. However, in a preferred embodiment of the invention, food grade vegetable glycerin, provides an organic solvent that is safely consumable, has compound protective properties, and therefore may be left in the final product as the base oil carrier for sublingual tincture or for topical salve. Process vessel 101 is annular in shape and is double walled to form an outer heating/cooling jacket for separate cycles of heating or cooking and cooling the mixture during processing.

Vessel 101 has a 50-gallon capacity and can process up to 450 pounds of organic material in a batch. Vessel 101 may be manufactured using food-grade stainless steel parts including an inner hollow vessel that holds the raw botanical material for processing and an amount of organic solvent. Vessel 101 includes a conically depressed bottom that extends beneath it and that includes a centrally located TC drain 103 for allowing the organic solvent to drain out of the vessel. Vessel 101 is supported by four legs and steel braces. Vessel 101 has a hinged opening at the top end depicted by lift handle 104 for loading in raw organic materials like whole hemp plant materials, cannabis flower, or other dedicated mixes of materials. Although not visible in this elevation view, vessel 101 supports at least one inlet fitting and one outlet fitting for attaching lines for pumping the chilled organic solvent through the gap formed by the vessel jacket, the jacket welded to or otherwise fixed to the vessel.

Vessel 101 is coupled to an agitation machine 101 designed and adapted as a stationary and automated paddle stirring machine for stirring the mixture within vessel 101 and keeping the mixture from idling near the walls of the vessel. Machine 101 includes a touch screen control user interface 105 for controlling heating and cooling cycles and for controlling the speed and direction of a paddle stirring apparatus inside the vessel supported by a power extension arm 106. Agitation machine 102 may be fabricated from sheet metals and food grade materials where those materials contact the mixture inside vessel 101, particularly the paddle stirring apparatus. In one embodiment, the previously mentioned expansion reservoir may be housed within the agitator machine housing (Nema 4x wash-down enclosure) and may be connected by hose line to vessel 101 to take any overflow of organic solvent used in processing.

Agitation machine 102 is supported by frame and legs and includes at least two height adjustable (leveling pads). Machine 102 is mechanically coupled, in a preferred embodiment) to vessel 101 for support, utility, and to stabilize the vertical paddle stirring apparatus (not visible) within the vessel. Mechanics inside machine agitator 102 may include, in one embodiment, a linear actuator and transitional gearing and a drive by an electric motor for driving the paddle apparatus and a high temperature centrifugal pump 107 for circulating a heated oil between the expansion reservoir and the outer jacket 301 of the vessel 101. The heated oil that may be circulated through the jacket of vessel 101 may be a glycerin-based food grade oil or another type of heating/cooling oil without departing from the spirit and scope of the invention. Oil that does not contact the product within vessel 101 is not required to be a glycerin or food grade oil. In one implementation, a variable speed frequency drive is provided to drive the stirring apparatus connected to arm 106.

In one embodiment, organic solvent may be physically loaded into vessel 101. In such an embodiment, organic solvent may be loaded into vessel 101 from a reservoir termed an expansion reservoir through a line connection made between the organic solvent source reservoir and the materials processing vessel. An emersion heater may also be provided to fit inside expansion reservoir. In one embodiment, more detail about introducing organic solvent into the raw materials and using heat/cold transfer oil to heat and cool the mixture is provided later in this specification.

A heat exchanger 108 is provided in equipment group 100 and is connected to agitation machine 102 by oil transfer lines 109 and 110 where one line is an ingress line and the other an egress line. For example, 109 may be an ingress line and 110 may be an egress line. One the other side of the heat exchanger 108 is a larger reservoir 114 that may contain up to 250 gallons of a heat transfer oil such as glycol (trade name). An oil pump 113 is provided in this embodiment and connected to heat exchanger 108 by an ingress line 111. Pump 113 is also connected to an egress line from a heat transfer oil reservoir 114 and is adapted to pump chilled heat transfer oil into heat exchanger 108 during a cooling cycle that alternates with a heating cycle during material processing. Heat exchanger 108 is also connected to reservoir 114 by an egress line 112. Heat transfer oil reservoir 114 is connected to a commercial grade glycol chiller unit 115 adapted to keep the heat transfer oil in reservoir 114 cold for use in the cooling cycles of the overall process. Reservoir 114 acts to reduce the workload for the commercial grade chiller unit 115.

Two components that are part of the overall process but are not illustrated in this view are a commercial grade oven used to decarboxylate the raw materials in preparation for material processing and to anneal the final product, and a commercial grade heat press to press organic oil from the organic plant material post cooking and cooling cycles. These utilities may be separate components not part of the closed loop equipment grouping 100.

Figure 2:
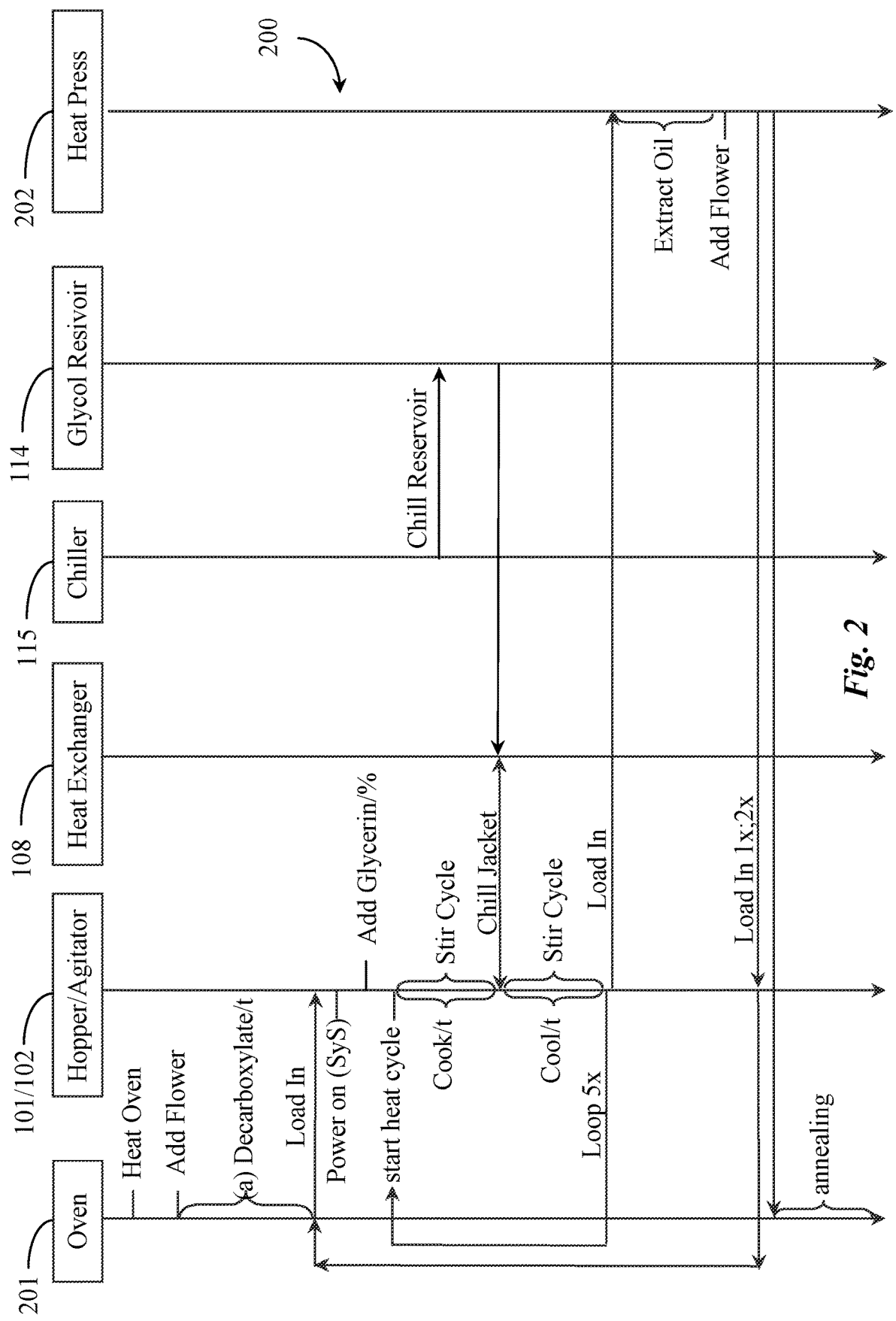
FIG. 2 is a sequence diagram depicting a sequence for creating a final CBD tincture or salve using the equipment group of FIG. 1 according to an embodiment of the present invention.

FIG. 2 is a sequence diagram 200 depicting a sequence for creating a final CBD product, such as a sublingual tincture or salve using the equipment group of FIG. 1 according to an embodiment of the present invention. This sequence diagram depicts each component involved in the overall process of the invention including the equipment grouping 100 of FIG. 1 and the components introduced in general description but not illustrated in FIG. 1, more particularly, oven 201 and heat press 202.

In a first preparatory step, a user or process overseer pre-heats oven 201 to a temperature between 200-275° F. (250 degrees nominal) for a commercial oven. If using a convection oven, 100-275° F. to decarboxylate the raw materials before hot/cold processing. In an example, 10 Ounces of CDB bearing trimmed flower having a CBD level >18% mat me gently broken up and placed on baking sheets. Thirty minutes at 250 degrees is enough to allow decarboxylation to take place with the flower.

Once the desired temperature is reached, the user may place the raw materials, such as ground flower, into the oven spread thin over space to obtain a uniform decarboxylation of the materials. In this example, the raw material is hemp or *cannabis* and the primary compound desired for extraction is CBD but could be any known cannabinoid. Decarboxylation changes the molecular structure of CBDA which is carbolic acid by removing a carboxyl group (carbon atom double bonded to oxygen atom) thus activating or producing the active CBD for recovery in the final product. Decarboxylating the material in oven 201 may take between 20 and 240 minutes. In one example, approximately 10 ounces of trimmed flower having a CBD level >18% and 2000 mL of glycerin oil (pure Vegetable Glycerin-Food grade clear colorless-Kosher Non GMO). The temperature to pre-heat may be 250 degrees F. on bake setting. The flower may be gently broken up and placed on baking sheets. Baking 30 minutes at the stated temperature will allow Decarboxylation to take place with the flower.

The decarboxylated raw materials may be loaded into the hopper/agitator (101, 102), and the system may be powered on. In one embodiment, food grade glycerin vegetable oil or another safe and consumable oil may be transferred into vessel 101 through an inlet from a separate connected oil reservoir (not illustrated). This might be accomplished by the user or by an automated part of the sequence. In one embodiment an expansion reservoir is provided and connected to the vessel and vessel jacket. The amount of glycerin oil or other consumable oil type to plant material (including raw plant material) may vary according to process design. For more viscous molecularly concentrated solutions less oil may be used perhaps less than 50 percent by volume than the botanical material to approximately 30 percent. The vertical stirring apparatus may be powered on and stirring materials as the glycerin is pumped into the vessel from the expansion reservoir. As the glycerin is added to the materials, a heat cycle or cook cycle may be started by automatic routine or by the user activating a control displayed on touch screen user interface 105 of FIG. 1.

In one embodiment a cooking timer may be set for approximately one hour and five minutes total cooking time. Stirring cycles may be every five minutes with actual stirring lasting three- and one-half minutes. The temperature reading on the cooking device may read approximately 205 degrees F. This leaves the product inside the pot approximately 190 degrees, which is the optimum temperature for cooking the mixture. In one embodiment, immediately after the hour and five minutes cooking cycle, an operator may remove the contents from the cooking vessel and place it on baking sheets as described further above with reference to oven decarb process. The batch product may then be placed in a blast freezer or a freezer refrigerator utility and may be quickly cooled down to a desired 70 degrees.

The heat cycle or cooking cycle is enabled by a circulation heating unit not illustrated) connected in line between the 50-gallon vessel 101 and the smaller capacity expansion reservoir. A circulation heating unit is an electric device connected inline for heating oil, liquids, or gas. A pump circulates a heat transfer fluid, in this case Glycol (trade name), through the heat jacket installed over the vessel 101. In one embodiment, a layer of insulation material or an insulation layer may be provided at the inside surface of the outer wall or on the outside surface of vessel 101 to prevent heat from escaping through the jacket material. In one embodiment, an electric immersion oil heater may also be provided and immersed inside vessel 101 having contact with the oil. In this example, a heat cycle is defined as a period of cooking or cooking/time ("cooking/t"). In this embodiment a cooking cycle for full capacity processing is approximately 90 minutes. The stirring cycle is performed in tandem with the heating cycle. In this way, the product mix is continually stirred within vessel 101 while the product mix is heated within the vessel.

The cooking cycle is followed by a cooling cycle, which is defined herein as a cooling period or cooling/time ("cooling/t"). A cooling cycle may include a process known to the inventor as stair stepping cooling ultimately cooling the mixture to room temperature in three to four hours. The glycol chiller unit may function to chill the glycol in glycol reservoir 114 when the closed-loop system is powered on or shortly thereafter. It is noted herein that the stirring apparatus of machine 102 may continue stirring unabated during transition from heating to cooling cycles. In one embodiment of the present invention, heating/cooling cycles may be repeated up to five times (5×). It is important to note herein that the target heat signature for the product mixture within vessel 101 does not exceed 190° F. (nominal temperature not to exceed 210° F.), preferably held to that target temperature of 190-195° F. over the cooking cycle. In this way, the product does not overheat. In one embodiment, a means to preserve at least some of the useful stand-alone and synergistic molecular sub-compounds such as terpenes may be practiced by adding raw plant material, such as flower or bud, that has not been decarboxylated at temperatures that may degrade or break down the terpenes.

The stirring cycles include stir periods and rest periods alternating throughout a cycle. For example, the mixture within vessel 101 may be stirred for three and one-half (3.5) minutes then rest for one and one-half (1.5) minutes. Stirring may be ordered in variable speeds and may be reversed in direction from clockwise to counterclockwise for example. In one embodiment, stirring cycles may be programmed by the process operator using the heat control UI screen on machine 102. Among other tasks, heating control, cycle periods, and number of process loop backs may be performed or set up for run by the process overseer operating at touch screen 105 of FIG. 1.

Once the activated product in vessel 101 undergoes the last cooling cycle, the mixture is at approximately 65-75° F. At this point the operator or user may unload the product at the bottom of the vessel through TC drain opening 103 of FIG. 1. Drain opening 103 may be a 3-inch drain valve or simple lock drain. In an alternative embodiment where the batch product is cooled in a blast freezer, once the temp is cooled down to 70 degrees, the batch material may be loaded back into the cooking vessel. Repeating the entire heating and cooling process four times. In this way the batch is repeatedly annealed. On a fifth heating cycle of the same batch, the batch is not purposely cooled because in a next process, a press is used to press oil out of the heated flower.

A user may take the mix from vessel 101 after last heating cycle and then load the material into mesh type strainer bags adapted to be used in a heat press operation on heat press 202. The mesh bags are microperforated to hold the plant materials and allow the pressed oil base carrier to be pressed out of the materials into a collection vessel. Heat press 202 may be a commercial grade press known to the inventor having a press capacity of up to 10,000 pounds per five square inches of press plate surface to further break down the plant fibers releasing more CBD oil. The material is hot going into the press. Mesh Bags or LSHP press cloth can be used to press out oil and retain plant matter. The press process includes loading the material in bags or cloth and pressing the oil from the plant materials. The oil falls into a warm depression for collection. In an example, ten ounces of flower and 2000 mL of glycerin may yield between 1500 mL and 1600 mL of infused CBD oil from the single batch.

The heat press results in the extraction of the concentrated CBD oil still left in the plant material, and the concentrated oil may be, after press, loaded into a new batch of decarboxylated starting plant material to increase the levels of the desired molecular compounds in the final product as a repeatable option the inventors have termed a double down process feature. In one embodiment, the operator may press to extract oil and then load that extracted oil back into vessel 101 with a fresh batch of raw materials up to two or three times, typically but as high as five times to concentrate the primary compounds in the carrier oil.

In one embodiment, an operator may add extracted oil from heat press 202 to raw materials that have not been decarboxylated in order to isolate and recover some of the more desired cannabinoids or terpenes to add to the concentrated CBD oil. In the general process, a final step involves loading the product out of press 202 and into oven 201 for a heat annealing process.

Figure 3:
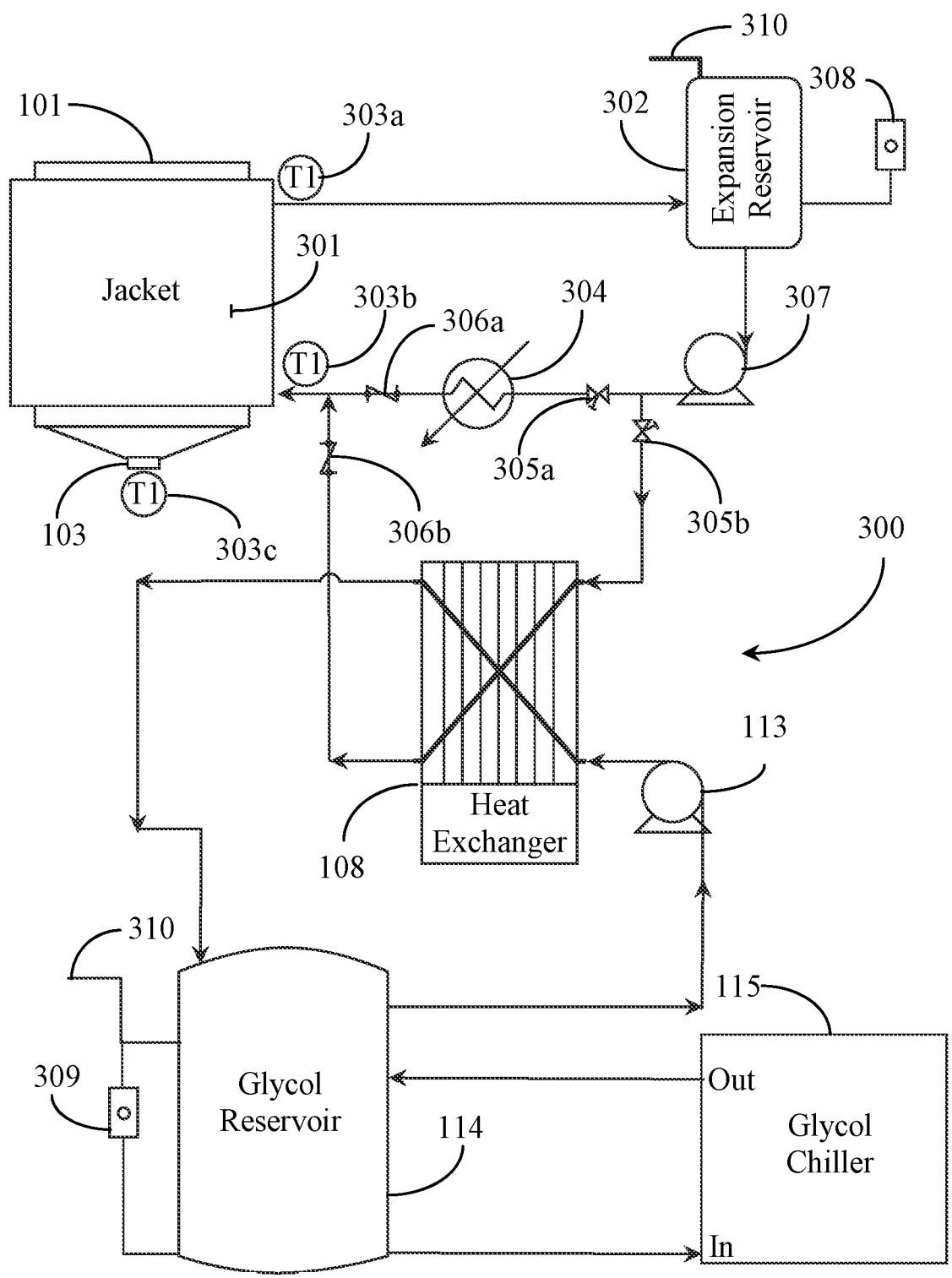
FIG. 3 is a block diagram depicting an expanded view of the equipment group of FIG. 1 depicting hot and cold processing capabilities according to an embodiment of the present invention.

FIG. 3 is a block diagram 300 depicting an expanded view of the equipment group 100 of FIG. 1 depicting hot and cold transfer capabilities according to an embodiment of the present invention. A heating cooling jacket 301 is depicted surrounding vessel 101. In this exemplary block depiction, there are three temperature sensors (T1) referred to herein as a sensor 303a installed at the egress port of jacket 303a, sensor 303b installed at the ingress port of jacket 301, and a 304 sensor 303c installed above drain 103 within vessel 101 (immersed sensor). The stirring machinery is not depicted in this view but may be assumed present and functional. In general processing, during the heating cycle, a heating unit 304 may be utilized to heat the organic solvent pumped between vessel 101 and an expansion reservoir 302. Heating unit 304 is provides on the ingress line leading into vessel 101. In one embodiment, an immersion heater may also be provided immersed at the lower end of the vessel body.

The organic solvent is pumped out of heating jacket 301 through expansion reservoir 302 using an onboard pump 307 analogous to pump 107 of FIG. 1. In this example, expansion reservoir includes a sight gauge 308 and an air release valve 310. In this architecture, a shut off valve 305a is provided inline behind the heater 304. Another shutoff valve is provided in a line to oil ingress port on heat exchanger 108. This prevents the oil from entering the heat exchanger during the cooking cycle and before cooling cycle begins.

A check valve 306a is provided ahead of the heater 108 in the ingress line to the vessel jacket to prevent any backward flow of oil. The stirring apparatus is continually stirring the mixture within vessel 101 helping to ensure the organic solvent is uniformly disbursed within the plant materials and that the heat of the mixture is also uniformly distributed. During the cooking cycle, the heat exchanger is not utilized. As the mixture heats up within vessel 101, temperature sensor 303c provides the temperature of the mixture being stirred. Sensor 303a measures the oil temperature at egress of the jacket, and sensor 303b measures the oil temperature at the ingress of the jacket 301. Heater 304 may be directly controlled by a user through interface 105 of FIG. 1.

At the start of cooling, shutoff valve 305a is closed and shutoff valve 305b is opened to allow the heated oil to pass through heat exchanger 108 and then back to the ingress line of jacket 301. A check valve 306b is provided in the oil egress line of the heat exchanger leading back to the jacket ingress line to prevent rearward flow of oil. The heater units may be switched off when the cooling cycle begins.

At the back end of the heat exchanger 108, pump 113 pumps cold glycol from reservoir 114, through heat exchanger 108 and then back to glycol reservoir 114 in the direction of the arrows. Glycol reservoir includes a sight gauge 309 and an air release valve 310. Chiller unit 115 includes a third pump (not illustrated) that pumps glycol out of reservoir 114 into the chiller unit then back out to the reservoir. In a preferred embodiment, the glycol cooling oil from reservoir 114 does not enter the vessel jacket. Rather the heat exchanger functions to absorb the heat in the oil flowing through the jacket, but the oils never intermix.

Additional sensors (T1) 303d and 303e are provided to check temperature of the transfer oil from the glycol reservoir in and out of the heat exchanger 108. The architecture depicted herein enables critical control of heating and cooling over time. It is critical that the product not overheat, and that temperature is relatively uniform (within a tolerance range) within the product, and that temperature not jump up or down too quickly. Heat expansion reservoir 302 may have a capacity of around 5 gallons or enough to keep the jacket full throughout the heating cycle and cooling cycle.

The oil circulating through the jacket during the heating cycle may be at a temperature of 250° F. when it first enters the ingress point at heat exchanger 108. The same oil exiting the heat exchanger 108 during the cool-down cycle is cooled to about 40° F. Glycol from glycol reservoir 114 is pumped to ingress of the heat exchanger via pump 113 and has a cold temperature of 30° F. The same glycol oil exiting the heat exchanger has a temperature of 82.5° F. on the way back to the reservoir. The target goal for the heated mixture in vessel 101 during the cooking cycle is approximately 190° F. The target cool-down temperature in the cool-down cycle is about 70° F.

In one implementation, the heat transfer oil is Isel Caldera-12 food grade glycerin oil. The glycol solution for cooling cycles contains at least 30% glycol by volume. The carrier base oil is glycerin oil in this implementation. The mixture is 100 percent organic with no additives introduced into the mixture. Other suitable oils for the carrier oil might be used without departing from the spirit and scope of the invention. Other suitable heat/cold transfer fluids or oils may be used to heat and chill vessel 101 without departing from the spirit and scope of the present invention.

Figure 4A:
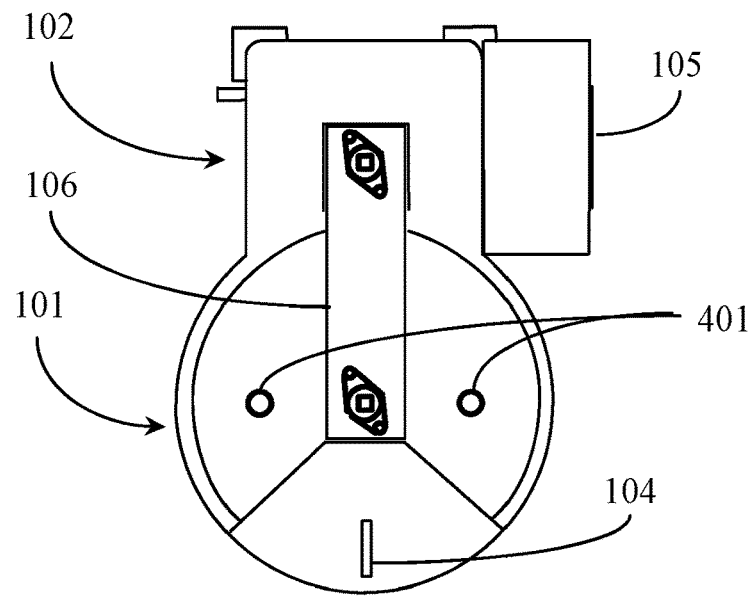
FIG. 4A is an overhead view of the raw material hopper and coupled agitator of FIG. 1.

FIG. 4A is an overhead view of the raw material hopper 101 and coupled agitator 102 of FIG. 1. In this view, vessel 101 is coupled to machine agitator 102 so that a vertical stirring apparatus using wiper paddle blades may be immersed into vessel 101 to keep the mixture stirred during cycling (hot, cold) to keep the hot and cool down temperatures uniform throughout the mixture. In this way the product does not overheat. It is also important in the process to transition from hot to cold temperatures and from cold to hot temperatures in a steady assent or decline. The heating and cooling cycles are time controlled and help, in conjunction with the stirring apparatus, to keep the temperature uniform throughout the mixture during the overall processing.

The top of vessel 101 has a hinged opening for loading raw materials and the carrier oil glycerin into the vessel. Lift handle 104 is provided for the purpose of opening the top of the vessel. Agitator machine 102 is mechanically integrated with the vessel and vessel jacket and transitional arm 106 supports the vertical stirring apparatus. The fixed portion of the top of vessel 101 includes at least two one and one-half inch diameter spray ball assemblies for enabling an operator to clean the inside of vessel 101 and drain out through the bottom TC drain apparatus.

The electrical components and motor and drive mechanics in machine agitator 102 are, in this implementation, enclosed in a Nema 4x wash-down type enclosure modified to work with the vertical paddle blade stirring apparatus. More detail about the stirring apparatus of machine agitator 102 is provided further below. The entire assembly is approximately 5 feet in height with a raw material processing capacity of about 450 pounds of flower or ground raw botanical materials.

Figure 4B:
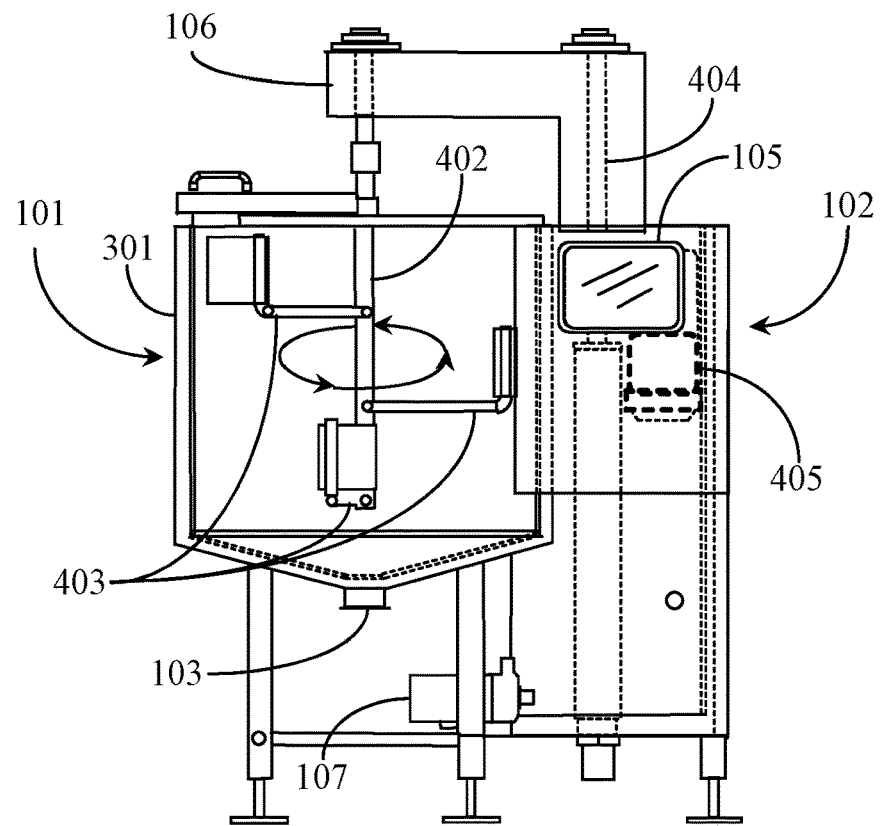
FIG. 4B is a side elevation view of the equipment of FIG. 4A with material removed to depict a stirring apparatus for agitating the product mix during processing.

FIG. 4B is a side elevation view of the equipment of FIG. 4A with material removed to depict a stirring apparatus for agitating the product mix during processing. Heating/cooling jacket 301 is interconnected by ingress and egress oil lines for circulation of heat transfer oil between the expansion reservoir housed within the Nema 4x enclosure. The circulation through jacket 301 is approximately 35 gallons per minute. In comparison, the circulation in the glycol system between the 250-gallon glycol reservoir and the heat exchanger is approximately 65 gallons per minute. In this embodiment, the heat transfer oil capacity or total volume is approximately 6 gallons.

A vertical stirring apparatus mentioned numerous times above is depicted herein as stirring apparatus 402. Stirring apparatus 402 includes at least three laterally extending arms mounted at different elevations along a vertical shaft that support paddle blades 403 at one paddle blade per arm. Paddle blades 403 may be molded using a high temperature food-grade polymer material that is resilient but flexible. Stirring apparatus 402 may be supported in position by transitional extension arm 106 and the fixed part of the vessel top piece. It is noted herein that a user or operator may remove stirring apparatus 402 from vessel 101 during cleaning operations.

Stirring apparatus 402 functions by turning clockwise or counterclockwise to both stir the mixture being processed during heat and cold cycles and for continually wiping the inside wall of vessel 101 to prevent materials from idling there. Agitation machine 102 may include the motor mechanics and gearing assemblies generally referred to herein as mechanics 405 for driving a shaft 404 connected by a horizontal transition drive (not illustrated) in extension arm 106 that connects to the vertical shaft 402 supporting the paddle blades. It is noted that the expansion reservoir is housed within the enclosure and the immersed heating element is placed within the expansion reservoir. In one implementation the immersed heater is separate from an in-line heater such as heater 304 described relative to FIG. 3.

The entire heating and cooling operation and stirring cycling is fully programmable and may be controlled from touch screen control UI 105. The system is a closed-loop system that keeps the cooling oil and heat transition oil separate in separate loops as discussed in the description above relative to FIG. 3. The only parts of the process that are not necessarily automated from touch-screen UI 105 are the decarboxylation process, the press extraction process, and the annealing process.

A term coined by the inventors, double down processing, is used to define a point in processing where extracted oil from a finished press run is added to fresh raw materials in vessel 101 for a next batch, or "doubled down" batch. The fresh raw materials for the next batch may be decarboxylated or not depending on the molecular preservation goals of the instant process. The inventors recognize the utility of glycerin being both an organic consumable base carrier for the final product and a preserving agent of fragile molecular compounds being isolated, in some cases created from precursors and recovered in desired form in the oil.

The pressed oil has a much higher concentration of the desired molecules than unheated un-pressed product mix after the heating and cooling cycles. This higher concentrate added back to a new batch enables manageable concentration of desired molecules in a finished sublingual tincture or salve. For example, after press operation, the press squeezed oil is added to a new batch material and new glycerin to bring volume back up to 10 ounces of flour (next batch) and 2000 mL of the glycerin oil. Yield in a double down batch may be between 1500 ML to 1600 ML of CBD infused double batch oil. Prior to bottling the oil, the entire batch of product may be put through a straining process to remove any last impediments or particulates that may be in the oil.

FIG. 5A are test results depicting amounts of desired molecular compounds extracted and recovered from a sample processed 2 times using the process of FIG. 2 and supporting equipment group of FIG. 1. Through empirical testing, the inventors have determined that the overall process works to concentrate CBD, CBDA, and other cannabinoids and desired compounds in a thick viscous oil.

Chart 500 represents identification of individual isolated and preserved cannabinoids in a sample product run two times (double down) and tested by a third-party testing service. In a 2x sample CBD variants including CBD-V, CBD-A, CBG, CBD, Delta 9-THC and CBC all register as recovered compounds in the final product. In second and third columns the trace amounts of the cannabinoids are listed and their percentages of the total sample volume. In this case, THC-V and CBN are not detected (ND) in any trace amount. In this test the raw material is hemp. Chart 501 gives the total weights and percentages of active cannabinoids derived and recovered in the final product during processing.

Active THC is held to 0.3 percent of the sample weight while maximum active CBD totals 9.95 milligrams or milliliters and comprises 0.8% percent of the sample weight. Total active cannabinoids accumulate to 9.81 milligrams or milliliters or 0.79% of the sample. Total cannabinoids recovered equal 11.10 milligrams or milliliters and bring the active or effective ingredients to 0.89% of the sample volume.

Chart 502 represents the CBD to THC ratio of the sample. In hem products the THC is markedly low and not sought for concentration. The CBD to THC ratio in the 2x sample is 28.9 to 1. THC to CBD ratio is determined 0.0 to 1.

FIG. 5B is a collection of test results depicting amounts of desired molecular compounds extracted and recovered from a sample processed 3 times using the process of the present invention. Chart 503 reveals the detected cannabinoids in a 3x sample of the same strain of raw materials. As can be seen the totals are elevated for desired active cannabinoids like CBD at 13.96 milligrams or milliliters compared to 8.81 for the 2x sample.

Chart 504 lists the totals for the cannabinoids revealing total cannabinoids in the 3× sample to be 17.09 milligrams or milliliters or 1.33% of the total sample weight, which is markedly higher than the 2× sample having 11.10 milligrams or milliliters of cannabinoids per volume. Total active cannabinoids in the 3× sample are 1.28% of the sample as compared to 0.79% in the 2× sample. The higher concentration of useable cannabinoids in the samples constituted with the press extracted oil make absorption of the molecules more efficient for consumers, ergo a higher absorption in less time. The following test results are included herein by the inventor and illustrated at least greater CBD concentration in final product using the double down process of the present invention supported by the disclosed equipment group. Some acronyms bound in parenthesis associated with chemical compound labels in the following test result figures have been omitted for the purpose of clarity and typing space.

Method of Making

Samples A, B, C, D, and E were made using the processes described herein and provide unexpected results as a higher quality extract. This higher quality product provides users of the product with unexpectedly positive outcomes that surpass expectations and meet a long felt need.

Test Results

Sample A
Analyses executed CAN Density (g/mL) 1.288
CAN-Cannabinoid Profile Analysis | By HPLC

| Analyte | LOD ppm | LOQ ppm | Result % | Result mg/ml |
|---|---|---|---|---|
| Cannabidiolic Acid (CBDA) | 0.01 | 0.02 | 0.01 | 0.08 |
| Cannabigerol (CBG) | 0.03 | 0.09 | 0.01 | 0.06 |
| Cannabidiol (CBD) | 0.01 | 0.04 | 0.36 | 2.82 |
| Cannabinol (CBN) | 0.03 | 0.1 | Not Detected | Not Detected |
| Tetrahydrocannabinol (THC) | 0.04 | 0.15 | 0.03 | 0.22 |
| Tetrahydrocannabinolic Acid (THCA) | 0.03 | 0.11 | Not Detected | Not Detected |

Total THC (THCa * 0.877 + THC) 0.03 0.28
Total CBD (CBDa * 0.877 + CBD) 0.37 3.72

Sample B
Analyses executed CAN, RES Unit
Volume (mL) 30.0 Density (g/mL) 1.277
CAN-Cannabinoid Profile Analysis | By HPLC

| Analyte | LOD ppm | LOQ ppm | Result % | Result mg/ml | Result mg/Unit |
|---|---|---|---|---|---|
| Cannabidiolic Acid (CBDA) | 0.01 | 0.02 | 0.06 | 0.49 | 14.56 |
| Cannabigerol (CBG) | 0.03 | 0.09 | 0.01 | 0.09 | 2.68 |
| Cannabidiol (CBD) | 0.01 | 0.04 | 0.46 | 3.63 | 108.80 |
| Cannabinol (CBN) | 0.03 | 0.1 | Not Detected | Not Detected | Not Detected |
| Tetrahydro-cannabinol (THC) | 0.04 | 0.15 | 0.02 | 0.13 | 3.83 |
| Tetrahydro-cannabinolic Acid (THCA) | 0.03 | 0.11 | Not Detected | Not Detected | Not Detected |

Total THC (THCa * 0.877 + THC) 0.02 0.16 3.83
Total CBD (CBDa * 0.877 + CBD) 0.52 5.17 121.57

Sample C
Analyses executed CAN, RES Unit
Volume (mL) 30.0 Density (g/mL) 1.283
CAN-Cannabinoid Profile Analysis | By HPLC

| Analyte | LOD ppm | LOQ ppm | Result % | Result mg/ml | Result mg/Unit |
|---|---|---|---|---|---|
| Cannabidiolic Acid (CBDA) | 0.01 | 0.02 | 0.02 | 0.17 | 5.00 |
| Cannabigerol (CBG) | 0.03 | 0.09 | 0.02 | 0.13 | 3.85 |
| Cannabidiol (CBD) | 0.01 | 0.04 | 0.68 | 5.27 | 158.19 |
| Cannabinol (CBN) | 0.03 | 0.1 | Not Detected | Not Detected | Not Detected |
| Tetrahydro-cannabinol (THC) | 0.04 | 0.15 | 0.03 | 0.23 | 6.93 |
| Tetrahydro-cannabinolic Acid (THCA) | 0.03 | 0.11 | Not Detected | Not Detected | Not Detected |

Total THC (THCa * 0.877 + THC) 0.03 0.30 6.93
Total CBD (CBDa * 0.877 + CBD) 0.70 6.95 162.57

Sample D
RES-Residual Solvents Testing Analysis
CAN-Cannabinoid Profile Analysis | By GC/FID
with Headspace Analyzer ug/g

| Analyte | LOD ug/g | LOQ ug/g | Result ug/g | Limit ug/g |
|---|---|---|---|---|
| Propane (Prop) | 0.2 | 0.5 | ND | 5000 |
| Butane (But) | 0.2 | 0.5 | ND | 5000 |
| Methanol (Metha) | 0.2 | 0.5 | 168.1 | 3000 |
| Ethylene Oxide (EthOx) | 0.2 | 0.5 | ND | 1 |
| Pentane (Pen) | 0.2 | 0.5 | ND | 5000 |
| Ethanol (Ethan) | 0.2 | 0.5 | ND | 5000 |
| Ethyl Ether (EthEt) | 0.2 | 0.5 | ND | 5000 |
| Acetone (Acet) | 0.2 | 0.5 | ND | 5000 |
| Isopropanol (2-Pro) | 0.2 | 0.5 | ND | 5000 |
| Acetonitrile (Acetonit) | 0.2 | 0.5 | ND | 410 |
| Methylene Chloride | 0.2 | 0.5 | ND | 1 |
| Hexane (Hex) | 0.2 | 0.5 | ND | 290 |
| Ethyl Acetate (EthAc) | 0.2 | 0.5 | ND | 5000 |
| Chloroform (Clo) | 0.2 | 0.5 | ND | 1 |
| Benzene (Ben) | 0.2 | 0.5 | ND | 1 |
| 1-2-Dichloroethane | 0.2 | 0.5 | ND | 1 |
| Heptane (Hep) | 0.2 | 0.5 | ND | 5000 |
| Trichloroethylene | 0.2 | 0.5 | ND | 1 |
| Toluene (Toluene) | 0.2 | 0.5 | ND | 890 |
| M,P-Xylene (mp-xyl) | | | ND | 2170 |
| O-Xylene (o-xyl) | | | ND | 2170 |

*The limit of 2170 ug/g for M,P-Xylene (mp-xyl) and O-Xylene (o-xyl) is to be intended as the two analytes combined.
ND: Not Detected Sample E
RES-Residual Solvents Testing Analysis
CAN-Cannabinoid Profile Analysis | By GC/FID with Headspace Analyzer

| Analyte | LOD ug/g | LOQ ug/g | Result ug/g | Limit ug/g |
|---|---|---|---|---|
| Propane (Prop) | 0.2 | 0.5 | ND | 5000 |
| Butane (But) | 0.2 | 0.5 | ND | 5000 |
| Methanol (Metha) | 0.2 | 0.5 | 119.1 | 3000 |
| Ethylene Oxide (EthOx) | 0.2 | 0.5 | ND | 1 |
| Pentane (Pen) | 0.2 | 0.5 | ND | 5000 |
| Ethanol (Ethan) | 0.2 | 0.5 | ND | 5000 |
| Ethyl Ether (EthEt) | 0.2 | 0.5 | ND | 5000 |
| Acetone (Acet) | 0.2 | 0.5 | ND | 5000 |
| Isopropanol (2-Pro) | 0.2 | 0.5 | ND | 5000 |
| Acetonitrile (Acetonit) | 0.2 | 0.5 | ND | 410 |
| Methylene Chloride | 0.2 | 0.5 | ND | 1 |
| Hexane (Hex) | 0.2 | 0.5 | ND | 290 |
| Ethyl Acetate (EthAc) | 0.2 | 0.5 | ND | 5000 |
| Chloroform (Clo) | 0.2 | 0.5 | ND | 1 |
| Benzene (Ben) | 0.2 | 0.5 | ND | 1 |
| 1-2-Dichloroethane | 0.2 | 0.5 | ND | 1 |
| Heptane (Hep) | 0.2 | 0.5 | ND | 5000 |
| Trichloroethylene | 0.2 | 0.5 | ND | 1 |
| Toluene (Toluene) | 0.2 | 0.5 | ND | 890 |
| M,P-Xylene (mp-xyl) | | | ND | 2170 |
| O-Xylene (o-xyl) | | | ND | 2170 |

*The limit of 2170 ug/g for M,P-Xylene (mp-xyl) and O-Xylene (o-xyl) is to be intended as the two analytes combined.
ND: Not Detected It will be apparent to the skilled person that the arrangement of elements and functionality for the invention is described in different embodiments in which each is exemplary of an implementation of the invention. These exemplary descriptions do not preclude other implementations and use cases not described in detail. The present invention shall be limited only by the following claims.

What is claimed is:

1. A process for extracting organic molecular compounds from raw plant material and concentrating those into a viscous oil, comprising steps of:
   a. decarboxylating the raw plant material in preparation for processing;
   b. loading the raw plant material into a cooking vessel formed from a double wall providing a volume enabled to accept heating and cooling fluid;
   c. adding food grade solvent into the cooking vessel;
   d. introducing and circulating a heating and cooling fluid through the volume created by the double wall;
   e. heating the fluid to a temperature range for a first time period;
   f. mechanically agitating the plant material and the food grade solvent in the cooking vessel during the first time period of step (e) by an agitating mechanism connected to and extending into the vessel;
   g. diverting the heated fluid into a connected heat exchanger, reducing temperature of the fluid to a chilled state including a second temperature range;
   h. introducing and circulating the chilled fluid through the volume created by the double wall for a second time period;
   i. mechanically agitating, via the agitation mechanism, the plant material and the food grade solvent in the cooking vessel during the second time period of step (h);
   j. repeat steps (e) through (i) a desired number of times to heat and then cool the plant material and food grade solvent;
   k. remove plant material from the cooking vessel and pressing it by a heat press;
   l. Press the plant material and collect first extracted oil;
   m. introduce the first extracted oil back into the cooking vessel of step i, with fresh plant material and the food grade solvent; and
   n. repeat step (d) through (m) a set number of times to concentrate the food grade solvent to achieve a higher percentage of recovered compound molecules resulting in the viscous oil.

2. The process of claim 1, wherein steps (e) through (i) are repeated a set number of times to heat and then cool the plant material and food grade solvent, thereby enhancing breakdown of the plant material with the mechanical agitation enabling a higher yield of the recovered compound molecules.

3. The process of claim 1, wherein steps (d) through (l) are optionally repeated a set number of times to concentrate the food grade solvent to a higher percentage of recovered compound molecules or to achieve a precise percentage of the desired compound molecules.

4. The process of claim 1, wherein step f is done with intermittent mechanical agitation for a period of time dependent on material and batch size.

5. The process of claim 1, wherein step (h) the chilled fluid is cooled by placing the chilled fluid at ambient room temperature; (2) accelerating the cooling process by having the material cooled via a cooling jacket surrounding the double wall with an appropriate apparatus at a temperature between −20 and 70 F; or (3) accelerating the cooling process by reducing the heat of the chilled fluid gradually, whereby the ambient room temperature surrounding the mixture is gradually lowered over time.

6. The process of claim 1, wherein the press used in step l is at enough force to extract the desired compounds from the plant material.

7. The process of claim 1, wherein the fluid is a heating and cooling transfer oil.

8. The process of claim 1, wherein the raw plant material is *cannabis*.

9. The process of claim 8, wherein the compound molecules include any one or more of cannabidiol (CBD), tetrahydrocannabinol (THC) and sub-compounds including terpenes.

* * * * *